Patented June 5, 1923.

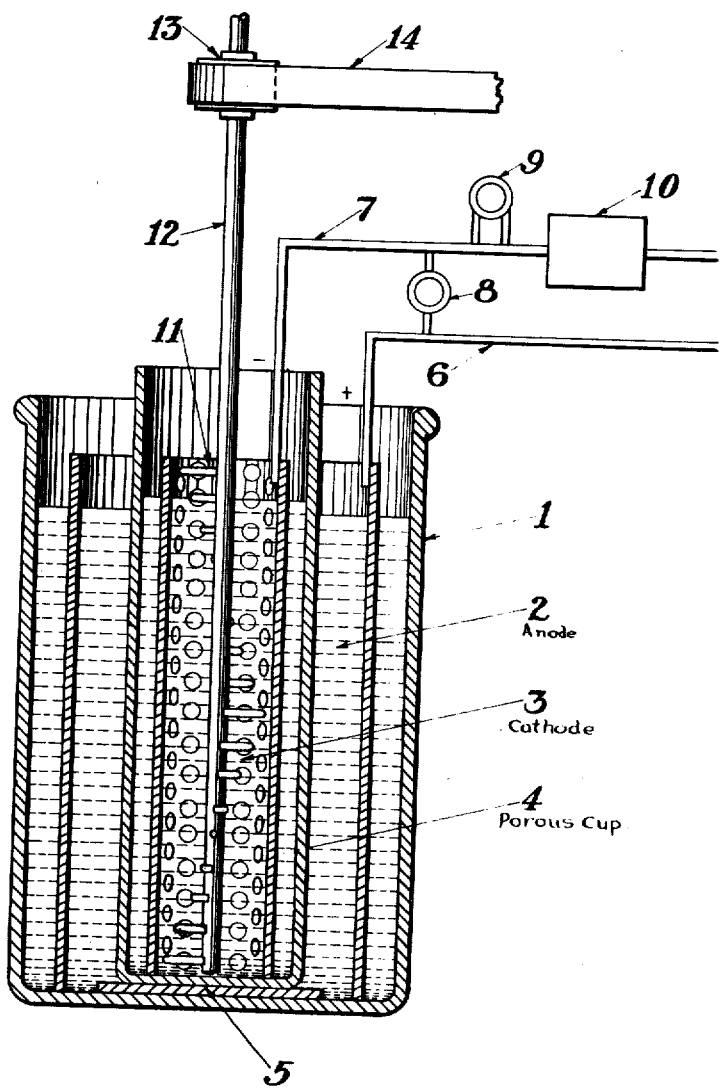

1,457,791

UNITED STATES PATENT OFFICE.

JAMES F. NORRIS AND EDMUND O. CUMMINGS, OF CAMBRIDGE, MASSACHUSETTS.

PROCESS OF MAKING SUCCINIC ACID.

Application filed October 20, 1922. Serial No. 595,754.

*To all whom it may concern:*

Be it known that we, JAMES F. NORRIS and EDMUND O. CUMMINGS, citizens of the United States, residing at Cambridge, in the county of Middlesex and State of Massachusetts, have invented certain new and useful Improvements in Processes of Making Succinic Acid, of which the following is a specification.

This invention relates to a process of making succinic acid from fumaric and maleic acids, and has more specific reference to an electrolytic process of reducing the latter acids to succinic acid.

It is an object of this invention to provide a method for effecting a high conversion of fumaric and maleic acids into succinic acid by electrolytic reduction.

In carrying out this process a cell is used, employing, preferably, a lead anode and lead cathode. However, other electrodes which are not attached may be used, for example, iron, copper, graphite, carbon, tin, zinc and mercury. The electrolyte consists of a dilute mineral acid, such as sulphuric or hydrochloric acid, which will not dissolve the anode and cathode under the conditions existing during the electrolysis, having either or both the fumaric and maleic acids in solution or partly dissolved and partly suspended therein. The fumaric and maleic acids are not completely soluble in the electrolyte under the preferred conditions of carrying out the process.

Reference is to be had to the accompanying drawing which shows, in more or less diagrammatic form, the preferred form of apparatus for carrying out the reduction. The apparatus comprises a vessel (1) of material capable of resisting the action of the electrolytes, such as glass, the anode (2) and the cathode (3), which may be perforated. The electrodes are preferably made of sheet lead. The apparatus shows the use of the porous cup (4), preferably of unglazed porcelain, which acts as a diaphragm, and surrounds the cathode (3) and is positioned upon the plate (5) at the bottom of the vessel (1). This diaphragm may, however, under certain conditions be dispensed with. The leads (6) and (7) are connected to the electrodes, and the apparatus is provided with the voltmeter (8), ammeter (9) and adjustable resistance (10) whereby the current passing through the cell may be determined and regulated.

The apparatus may also be provided with the stirrer (11) operated by the shaft (12), pulley (13) and belt (14).

The electrolyte consisting of the dispersion of either the fumaric or maleic acid, or both of these acids in the dilute mineral acid is placed in this cell and electrolyzed, preferably stirring the electrolyte until the desired dispersion is obtained. However, stirring may be dispensed with, without appreciably affecting the current density.

The reduction should be carried out under conditions where gassing and loss of hydrogen is prevented as much as possible. A high current density cannot be used if the concentration in the solution of the dissolved fumaric or maleic acids is low, because under such conditions gassing and loss of hydrogen will result. At higher temperatures, the solubilities of the fumaric and maleic acids are increased and therefore greater current densities may be employed under such conditions without losing hydrogen by gassing, and as a result the time required for the reduction is greatly reduced when operating at higher temperatures and with higher current densities, thus resulting in increased current efficiency.

In selecting the current density to be used, as great an amount of current is passed through the apertures as can be employed without gassing. As the reduction proceeds, the concentration of the fumaric or maleic acid decreases, thus promoting evolution of hydrogen, and when gassing begins the current density is decreased.

The preferred operating temperatures are from 60° or 70° to 90° or 100° C., and the amount of acid employed is such that the dispersions of the fumaric or maleic acids therein are not too thick. Although lead anodes and lead cathodes are preferred in carrying out this process, it is to be understood that this invention is not so limited but other substances, such as graphite, may be substituted for the lead.

The following is a specific example of reducing fumaric acid, without employing a diaphragm. About 60 grams of fumaric acid are added to about 900 c. c. of water at 80° C. and placed in the cell, and to this is slowly added a solution of 15 c. c. $H_2SO_4$ (specific gravity 1.84) in 100 c. c. of water. Any fumaric acid which is precipitated by the $H_2SO_4$ is kept in suspension by means of the stirrer. The electrolysis is then begun, using a cathodic current density of 6.5 amperes per square decimeter until about 88% of the theoretical current has been passed. The current density may then be reduced to about 2.5 amperes per square decimeter until about 10% excess current has been used.

After the reduction, the solution is transferred to a suitable evaporator and then concentrated, and the succinic acid crystallizes from the concentrated liquor upon cooling. By this process yields of 90% or over may be obtained.

The porous diaphragm has been found of greater value when electrolytically reducing maleic acid than fumaric acid, and the electrolytic reduction of the latter may be carried on very efficiently without the use of the diaphragm.

The following example illustrates a process of preparing succinic acid from maleic acid, using a diaphragm. Within the porous cup there is placed about 120 grams of maleic acid in a solution of about 15 c. c. $H_2SO_4$ (specific gravity 1.84) in about 400 c. c. of water. In the anode compartment a 5% sulphuric acid solution is used. The reduction is then proceeded with as in the previous example, using a cathodic current density of about 8 amperes per square decimeter until about 96% of the theoretical current has passed, and then a current density of about 3 amperes per square decimeter until about 5% excess of the theoretical current has passed. After reduction, the cathodic solution is transferred to a suitable evaporator and then concentrated and the succinic acid recovered by crystallization from the concentrated liquor.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of making succinic acid, electrolytically reducing a dispersion of an acid of the formula $C_2H_2(COOH)_2$, in a solution of a mineral acid which will not react in substantial amounts with the electrodes employed for the electrolysis.

2. In a process of making succinic acid, electrolytically reducing a dispersion of an acid of the formula $C_2H_2(COOH)_2$, in a dilute solution of a mineral acid which will not react in substantial amounts with the electrodes employed for the electrolysis.

3. In a process of making succinic acid, electrolytically reducing a dispersion of said acid in a dilute solution of sulphuric acid.

4. In a process of making succinic acid, reducing by means of a current of high density a dispersion of an acid of the formula $C_2H_2(COOH)_2$, in a solution of a mineral acid which will not react in substantial amounts with the electrodes employed for the electrolysis and decreasing the current density as the concentration of the dissolved organic acid is lowered.

5. In a process of making succinic acid, reducing by means of a current of high density a dispersion of an acid of the formula $C_2H_2(COOH)_2$, in a dilute solution of a mineral acid which will not react in substantial amounts with the electrodes employed for the electrolysis and decreasing the current density as the concentration of the dissolved organic acid is lowered.

6. In a process of making succinic acid, reducing by means of a current of high density a dispersion of an acid of the formula $C_2H_2(COOH)_2$, in a dilute solution of sulphuric acid and decreasing the current density as the concentration of the dissolved organic acid is lowered.

7. In a process of making succinic acid, electrolytically reducing, with a porous diaphragm, a dispersion of an acid of the formula $C_2H_2(COOH)_2$ in a solution of a mineral acid which will not react in substantial amounts with the electrodes employed for the electrolysis.

8. In a process of making succinic acid, electrolytically reducing, with a porous diaphragm, a dispersion of an acid of the formula $C_2H_2(COOH)_2$ in a dilute solution of a mineral acid which will not react in substantial amounts with the electrodes employed for the electrolysis.

9. In a process of making succinic acid, electrolytically reducing, with a porous diaphragm, a dispersion of an acid of the formula $C_2H_2(COOH)_2$ in a dilute solution of sulphuric acid.

10. In a process of making succinic acid, electrolytically reducing at temperatures of 70–90° C., a dispersion of an acid of the formula $C_2H_2(COOH)_2$ in a solution of a mineral acid which will not react in substantial amounts with the electrodes employed for the electrolysis.

11. In a process of making succinic acid, electrolytically reducing, at temperatures of 70–90° C., a dispersion of an acid of the formula $C_2H_2(COOH)_2$ in a dilute solution of a mineral acid which will not react in substantial amounts with the electrodes employed for the electrolysis.

12. In a process of making succinic acid, electrolytically reducing, at temperatures of 70–90° C. and with a porous diaphragm, a dispersion of an acid of the formula $C_2H_2(COOH)_2$ in a solution of a mineral acid which will not react in substantial amounts with the electrodes employed for the electrolysis.

13. In a process of making succinic acid, electrolytically reducing, while stirring, a dispersion of an acid of the formula $C_2H_2(COOH)_2$ in a solution of a mineral acid which will not react in substantial amounts with the electrodes employed for the electrolysis.

14. In a process of making succinic acid, electrolytically reducing, while stirring and with a porous diaphragm, a dispersion of an acid of the formula $C_2H_2(COOH)_2$ in a solution of a mineral acid which will not react in substantial amounts with the electrodes employed for the electrolysis.

15. In a process of making succinic acid, electrolytically reducing, while stirring and with a porous diaphragm, a dispersion of an acid of the formula $C_2H_2(COOH)_2$ in a solution of a mineral acid which will not react in substantial amounts with the electrodes employed for the electrolysis, and then effecting crystallization of the succinic acid from the resulting liquid.

16. In a process of making succinic acid, electrolytically reducing, with a porous diaphragm, a dispersion of an acid of the formula $C_2H_2(COOH)_2$ in a dilute solution of a mineral acid which will not react in substantial amounts with the electrodes employed for the electrolysis, and then effecting crystallization of the succinic acid from the resulting liquid.

17. In a process of making succinic acid, electrolytically reducing, at temperatures of 70–90° C., while stirring and with a porous diaphragm, a dispersion of an acid of the formula $C_2H_2(COOH)_2$ in a dilute solution of a mineral acid which will not react in substantial amounts with the electrodes employed for the electrolysis, and then effecting crystallization of the succinic acid from the resulting liquid.

18. In a process of making succinic acid from fumaric and maleic acids, electrolytically reducing at 70–90° C., while stirring and with a porous diaphragm, a dispersion of an acid of the formula $C_2H_2(COOH)_2$ in a dilute solution of sulphuric acid, and then effecting crystallization of the succinic acid from the resulting liquid.

In testimony whereof we affix our signatures.

JAMES F. NORRIS.
EDMUND O. CUMMINGS.

Certificate of Correction.

It is hereby certified that in Letters Patent No. 1,457,791, granted June 5, 1923, upon the application of James F. Norris and Edmund O. Cummings, of Cambridge, Massachusetts, for an improvement in "Processes of Making Succinic Acid," errors appear in the printed specification requiring correction as follows: Page 1, line 22, for the word "attached" read *attacked*, and line 86, for the word "apertures" read *apparatus;* page 2, lines 63 and 64, claim 3, strike out the words "said acid" and insert instead *an acid of the formula $C_2H_2(COOH)_2$;* page 3, line 44, claim 18, strike out the words "from fumaric and maleic acids"; and that the said Letters Patent should be read with these corrections therein that the same may conform to the record of the case in the Patent Office.

Signed and sealed this 26th day of June, A. D., 1923.

[SEAL.]
KARL FENNING,
*Acting Commissioner of Patents.*